United States Patent Office 3,647,549
Patented Mar. 7, 1972

3,647,549
SOLID STATE CELL WITH A TELLURIUM TETRAIODIDE CATHODE
Joseph H. Christie, Fort Collins, Colo., and James R. Humphrey, Albany, Oreg., assignors to North American Rockwell Corporation
Filed July 21, 1970, Ser. No. 56,790
Int. Cl. H01m 21/00
U.S. Cl. 136—83 R
15 Claims

ABSTRACT OF THE DISCLOSURE

An electron-acceptor material selected from tellurium tetraiodide and its complexes as a cathode component for a solid state electric cell containing a silver anode and a silver-ion-conducting solid electrolyte. The tellurium tetraiodide compositions utilized as electron-acceptor cathode component consist of tellurium tetraiodide alone or as a complex of tellurium tetraiodide preferably with selected alkali metal iodides or organic ammonium iodides.

BACKGROUND OF THE INVENTION

This invention relates to solid state electric cells having improved cathode compositions. It more particularly relates to such solid state electric cells having an ionically conductive silver composition as solid electrolyte element.

Solid state electric cells utilizing a solid ionic conductor as electrolyte are known and are generally advantageous compared with conventional cells and batteries with respect to shelf-life stability, leak-free properties, and flexibility with respect to construction design and miniaturization. One such cell employing silver iodide as the solid electrolyte is described in U.S. Pat. 2,689,876. Improved solid state cells having a solid electrolyte whose ionic conductivity is greater than that of silver iodide are shown in U.S. Pat. 3,443,997 wherein $KAg_4I_5$, $RbAg_4I_5$, and $NH_4Ag_4I_5$ are utilized as solid electrolyte elements and in U.S. Pat. 3,476,606 wherein organic ammonium silver iodides are utilized as solid electrolyte elements.

The solid state electric cells generally utilize silver as an electron-donor anode material, and a non-metal capable of functioning as an electron acceptor for the cathode material. Several such cathode materials are shown in U.S. Pat. Re. 24,408. Iodine dispersed in a carbon matrix is utilized therein as cathode material, although other iodine sources such as $RbI_3$, $CsI_3$, and $NH_4I_3$ have also been suggested. Since elemental iodine, whether obtained from pure iodine or polyiodides, may be lost by diffusion or evaporation, the cell generally requires encapsulation with a special protective resin or other material. For a solid state cell using a pure iodine cathode, an open circuit voltage of about 0.67 volt is obtained.

However, the use of pure iodine as cathode material has been found disadvantageous because of the occurrence of cell corrosion, loss in cell stability, and poor shelf life due to excessively high iodine activity, resulting in reaction of iodine with the solid state electrolyte or the other cell components. Attempts have been made to use the inorganic alkali metal polyiodides, e.g., $RbI_3$, $CsI_3$, as cathode components. While this results in a lowering of the iodine activity, there is a substantial increase in material costs and a lower availability of iodine based on unit weight of the cathode component.

In U.S. Pat. 3,476,605 the use of organic ammonium polyiodides as cathode component has been suggested. While such electron-acceptor materials are advantageous in several respects compared with the inorganic alkali metal polyiodides, they nonetheless also have a significant free iodine vapor pressure, which effectively prevents the successful preparation and utilization of thin film cathodes.

Takahashi and coworkers have suggested the use of mixtures of Te and $Ag_2Te$ and also of Se and $Ag_2Se$ as cathode materials in solid electrolyte cells. However, the use of such oxidants results in a cell having a much lower open circuit voltage, namely, 0.217 and 0.265 v. respectively, at 20° C.

SUMMARY OF THE INVENTION

It is an object of the present invention to provide a non-iodine-yielding cathode material for a solid state electric cell. In contrast to known iodine-providing electron-acceptor materials for use in the cathodes of solid state cells, the electron-acceptor compositions of the present invention have no significant iodine vapor pressure. At the same time they provide iodide ion upon reduction and an open circuit voltage but slightly lower than that obtained with an iodine-yielding cathode material.

It is a further object to provide an electron-acceptor cathode material that is particularly compatible for use with alkali metal silver iodide and organic ammonium silver iodide solid electrolytes to provide solid electric cells having longer shelf life, less corrosion, and greater cell stability, particularly at elevated temperatures. The cathode materials of this invention are particularly suited for the preparation of and use in thick-film and thin-film solid state batteries as well as in pellet-type cells because of their negligible iodine vapor pressure.

In accordance with the present invention, there is provided a solid state electric cell utilizing novel electron-acceptor materials to provide improved cathodes. The cell comprises a conductive anode, preferably of silver, an ionically conductive solid state electrolyte, preferably containing silver ions for conduction of current, and a cathode composition including $TeI_4$, alone or in admixed or complexed form, as electron-acceptor material.

While $TeI_4$ may be used alone as electron-acceptor material in the cathode composition, it is generally preferred to use it in complexed form. Substantially any material which does not interfere with the electrochemical cell reaction, such as by decomposing the solid electrolyte, may be used to form a mixture or complex with $TeI_4$. The electron-acceptor components of the cathode compositions characterized as complexes of $TeI_4$ may constitute simple mixtures, single-phase solid compounds, or multiphase mixtures of several such compounds. For example, a tetravalent tellurium heterohalide may be utilized, e.g., $TeCl_3I$, and this is regarded as a $TeI_4$ complex, $TeI_4 \cdot 3TeCl_4$, for the purposes of the present invention.

While various considerations relating to physical properties and cost are involved in selecting the complexing material, it is generally preferred to complex the $TeI_4$ with those materials which will form conductive compositions when the electron-acceptor material undergoes reduction during the discharge reaction. Such preferred compounds for forming complexes with $TeI_4$ are represented as MI and QI, where M is selected from K, Rb, $NH_4$, Cs, and combinations thereof, Cs being present only as a minor constituent of M, as described in U.S. Pat. 3,443,997; and where Q is a univalent organic ammonium cation having an ionic volume between 30 and 85 cubic angstroms, as described in U.S. Pat. 3,476,606. In its particularly preferred embodiments, the electron-acceptor materials may be represented as $TeI_4 \cdot aMI$ and $TeI_4 \cdot bQI$ where $a$ and $b$ have any values between 0 and 2, inclusive. Such complexes form high-conductivity reaction products when reacting with silver ions during the cell discharge reaction. Thereby there is little or negligible increase in the internal resistance of the cell during the cell reaction.

In a preferred embodiment of an ionically conductive cell, the anode consists of an intimate mixture of silver, carbon, and solid electrolyte, as described in U.S. Pat. 3,503,810, and the cathode consists of a mixture of electron-acceptor material and carbon, and generally also solid electrolyte. For certain applications, particularly where no solid electrolyte material is included in the cathode composition, it is desirable that the reaction product formed in the cathode during the cell reaction have its conductivity optimized. Such an optimized reaction product may be obtained by utilizing such electron-acceptor cathode components represented by the formulas $TeI_4 \cdot Rb_2TeI_6$, i.e., $(TeI_4 \cdot RbI)$ and

$$4[(CH_3)_4N]_2TeI_6 \cdot 9TeI_4$$

i.e., $[TeI_4 \cdot 0.62(CH_3)_4NI]$. These compositions appear to be multiphase mixtures of $TeI_4$ with the solids having the empirical formulas $Rb_2TeI_6(TeI_4 \cdot 2RbI)$ and

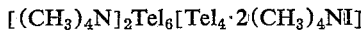

$$[(CH_3)_4N]_2TeI_6[TeI_4 \cdot 2(CH_3)_4NI]$$

respectively.

DESCRIPTION OF THE PREFERRED EMBODIMENTS

Figure 1:
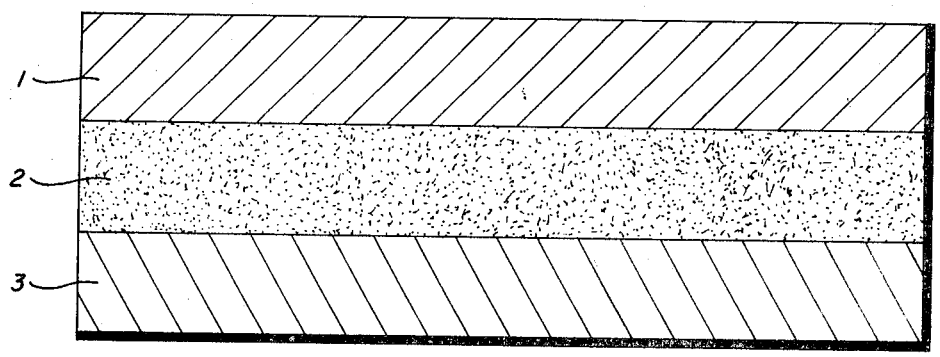
FIG. 1 is a cross-sectional view of an idealized embodiment of the solid state electric cell provided by this invention.

The electron-acceptor cathode component of the present invention may be utilized in any solid state electric cell having a conductive anode as electron donor, preferably silver, and an ionically conductive solid electrolyte wherein the current preferably is transported by silver cations. The cathode compositions of this invention, namely, $TeI_4$ and complexes thereof, although providing available iodide ion, have substantially no iodine activity, particularly when compared with pure iodine, inorganic polyiodides, and most organic ammonium polyiodides.

The iodine activity may be generally expressed as the ratio of the equilibrium vapor pressure of iodine in a compound having available iodine to that of pure $I_2$ itself at a given temperature. Since the iodine activity is related to the electromotive force of the cell as described by the well-known Nernst equation, the activity of the iodine may be expressed in terms of cell voltage itself. For a pure iodine cathode, and open circuit voltage of about 0.67 volt is obtained. Using an inorganic polyiodide such as $RbI_3$ as cathode component, an open circuit voltage between 0.66 and 0.67 volt is obtained. Using the organic ammonium polyiodides shown in U.S. Pat. 3,476,605 as cathode materials, open circuit voltages between 0.60 and 0.665 volt are found. For tellurium tetraiodide and its complexes, utilized in the present invention as cathode materials, open circuit voltages of about 0.50 volt are obtained.

In general, as the iodine activity decreases, the cell becomes more stable, its shelf life increases, and less corrosion occurs. However, as the cell voltage is lowered the available current flow becomes more limited. Thus the selection of a particular electron-acceptor cathode component represents a balance between cell stability and desired cell voltage and resulting current flow, and will be determined by the particular cell characteristics desired and the planned use of the cell.

The cathode compositions of the present invention find particular application for use in thick-film, thin-film, and pellet-type solid state cells and for use at elevated temperatures up to 230° C., because of the absence of any significant iodine vapor pressure and the consequent high temperature stability. While these cathode components may also suitably be used at temperatures as low as —50° C., for continuous low-temperature operation at maximum cell voltage, a polyiodide cathode material is generally preferred. Where it is desired to provide a solid state electric cell which may be operated or recycled over a wide temperature range, e.g., from —50° C. to 150° C., the tellurium tetraiodide compositions of the present invention are preferred as electron-acceptor materials.

The electrochemical cell mechanism and the chemical reactions occurring within a solid state cell are highly complex and but imperfectly understood, and the following explanation should not be construed as limiting the scope of the present invention. During cell discharge, silver ions migrate through the solid silver-ion electrolyte to react with the electron-acceptor material in the cathode to form various reaction products. It is preferred that the reaction products formed during discharge be of relatively high ionic conductivity, i.e., at least greater than that of silver iodide, to avoid an increase in internal cell resistance and in cell polarization. Thus where a silver-containing anode is used, together with a silver-ion-conducting solid electrolyte, then the electron-acceptor cathod component present will preferably be $TeI_4 \cdot aMI$ or $TeI_4 \cdot bQI$, where $a$ and $b$ have any values between 0 and 2, M and Q being as previously defined. Thereby formation of a high resistivity reaction product in the cathode or at the cathode-electrolyte interface and resultant degradation of the cell current is minimized.

Where $a$ and $b$ have values of zero, then the cathode component will be $TeI_4$ alone and the cell reaction will correspond to

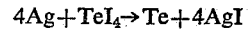

$$4Ag + TeI_4 \rightarrow Te + 4AgI$$

Where it is desired to optimize the conductivity of the reaction product formed by avoiding the formation of any high resistivity, conductivity-diluting materials, then $a$ preferably has a value of 1, particularly at temperatures below 140° C. Such a composition may be represented as $TeI_4 \cdot M_2TeI_6$ ($TeI_4 \cdot MI$). Thus in a typical cell discharge reaction at a temperature above 27° C.:

$$8Ag + TeI_4 + Rb_2TeI_6 \rightarrow 2Te + 2RbAg_4I_5$$

a high conductivity material, $RbAg_4I_5$, is formed.

Suitable QI compounds utilized to form the single-phase and multiphase complexes with tellurium tetraiodide are shown in Table 1 of U.S. Pat. 3,476,606. As noted therein, for an organic ammonium electrolyte having the empirical formula $QI \cdot nAgI$, conductivities for values of $n$ of 4, 6, and 8 are given. Where it is desired to have a material of optimum cell conductivity formed at the cathode during the cell discharge reaction, such a reaction product is provided where $b$ is selected to give an optimized reaction product corresponding to values of $n$ between 4 and 9 depending on the particular Q component selected. For the tetramethyl ammonium complex, $b$ has a value of $8/13$ (0.62). Illustratively, this optimized tetramethyl ammonium reaction product is provided by the multiphase mixture $4[(CH_3)_4N]_2TeI_6 \cdot 9TeI_4$, and is believed to be formed in accordance with the following cell discharge reaction:

$$52Ag + 9TeI_4 + 4[(CH_3)_4N]_2TeI_6 \rightarrow 13Te + 4[(CH_3)_4N]_2Ag_{13}I_{15}$$

The formed reaction product may also be expressed as $(CH_3)_4NI \cdot 6\frac{1}{2}AgI$, and represents an optimized conductive composition.

For ease and simplicity in preparing the cathode compositions, and also to provide less costly procedures and components, it is generally preferred that Q be a relatively simple ammonium cation. Illustrative of such preferred ammonium cations are those obtained by the attachment of simple aliphatic substitutent groups to the nitrogen atom of the quaternary ammonium cation complex, e.g., $Me_4$, $Me_3Et$, $Me_3Pr$, $Me_3i$-$Pr$, $Me_2Et_2$, $MeEt_3$, $MeEt_2Pr$, $MeEt_2i$-$Pr$, $Et_4$, $MeEt_2Bu$, $Et_3Pr$, and $Me_3Ay$, where Me=methyl, Et=ethyl, Pr=propyl, i-Pr=isopropyl, Bu=butyl, and Ay=allyl. Because of their ready availability as starting materials, the lower alkyl groups, particularly methyl and ethyl, are particularly preferred as substituent groups. However, other organic ammonium cations may be utilized for Q, as shown in U.S. Pats. 3,476,605 and 3,476,606.

Tellurium tetraiodide itself may be readily prepared by reaction of tellurium metal with elemental iodine, as is well known in the art. In preparing the various preferred tellurium tetraiodide complexes, $TeI_4$ may be directly reacted in the solid state with the MI or QI component in desired selected proportions. Alternatively, a solid state reaction in a closed vessel may be performed wherein tellurium metal, elemental iodine and the desired MI or QI material are reacted in suitable proportions at an elevated temperature, suitably between 100 and 200° C., to form the desired cathode component. At the same time, carbon and electrolyte material may be optionally and preferably included with the electron-acceptor component so as to provide a final cathode composition consisting of a mixture of complexed tellurium tetraiodide component, carbon, and electrolyte material.

Referring to FIG. 1 of the drawing, there is shown a cross-sectional view of an idealized embodiment of a solid state electric cell provided by the invention. The several layers are shown in nonscalar simplified form. An anode 1 consists of any suitable metallic conductor which functions as an electron donor. Preferably, silver is used as the anode material, although copper, lithium, and other conductive materials may also be utilized with an appropriate solid electrolyte. The electrolyte 2 comprises an ionically conductive solid state electrolyte material, generally those containing silver ions for conduction of current. Particularlly preferred as electrolyte because of their high conductivity are the ionically conductive compositions shown in U.S. Pats. 3,443,997 and U.S. 3,476,606, i.e., the alkali metal silver iodide and organic ammonium silver iodide electrolytes, respectively.

The advantages provided by the present invention are obtained by using tellurium tetraiodide or its complexes, particularly those herein set forth, as the electron-acceptor component of the cathode 3, thereby providing a solid state electric cell having essentially no iodine activity and offering the advantages of thick-film and thin-film formation, less cell corrosion, and increased cell stability and shelf life without undue degradation of the current-carrying capacity of the cell, particularly at elevated temperatures. Electrical leads, not shown, are conventionally attached to the anode 1 and cathode 3.

Various solid state cell systems may be improved by utilizing tellurium tetraiodide as cathode materials therein because of the high availability of iodide ion on an equivalent weight basis when the tellurium tetraiodide oxidant is reduced. At the same time, each tetravalent tellurium cation is reduced to yield four electrons. Such an improved solid state cell for example comprises a lithium anode, a lithium iodide electrolyte, and a cathode of tellurium tetraiodide and carbon. However, the present invention will be particularly illustrated with respect to its use in solid state cells using ionically conductive solid electrolytes containing silver ions for conduction of current because of the present importance of such cells.

The most advantageous results in the practice of this invention are obtained when both the anode and cathode of the solid state electric cell are of composite structure and contain finely divided conductive carbon dispersed therein. Generally a solid electrolyte material is also dispersed in the anode, and optionally in the cathode.

Thus for a typical preferred solid state cell the anode 1 consists of an intimate mixture of silver, solid electrolyte material such as $RbAg_4I_5$, and finely divided conductive carbon. In U.S. Pat. 3,503,810 is shown a method of preparing a suitable anode composition. The electroylte 2 consists of $RbAg_4I_5$, and the cathode 3 consists of a mixture of $Rb_2TeI_6$, $RbAg_4I_5$, and carbon.

The relative amounts of carbon, electrolyte, and electron-acceptor component, whether using $TeI_4$ alone or in complexed form, are not critical and may be varied over a wide range. Preferred relative amounts of the three components of the cathode blend, on a weight percentage basis, are 20–80 electron-acceptor material, 5–60 carbon, and 0–50 electrolyte material. The electroylte material present in anode 1 and cathode 3 is preferably of the same composition as the material used for electrolyte element 2.

Figure 2:
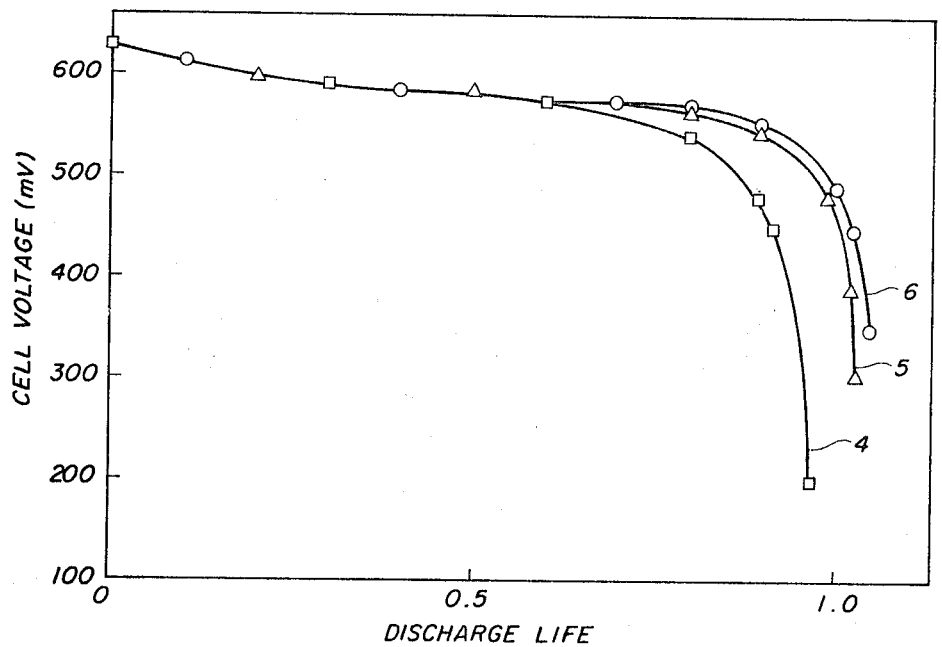
FIG. 2 is a graphical representation of three discharge curves for cells of this invention obtained for different rates of discharge at a temperature of 175° C.

Referring to FIG. 2, three cell discharge curves are shown for 25-millimeter-diameter single cells discharged at a temperature of +175° C. These cells were essentially similar in construction and were discharged at normalized rates corresponding to a total theoretical discharge life for time periods of one day, one week, and one month. The anode of the cells consisted of silver in admixture with carbon black and electrolyte, the solid electrolyte was rubidium silver iodide ($RbAg_4I_5$), and the cathode consisted of a tellurium iodide composition $[(CH_3)_4N]_2TeI_6$ in admixture with carbon black, no solid electrolyte material being included. Curve 4 represents the discharge curve for a normalized one-day discharge life, obtained by discharging the cell at a constant current of 8.33 milliamperes. Curve 5 represents the discharge curve for a normalized one-week discharge life, obtained by discharging the cell at a constant load of 510 ohms. Curve 5 represents the discharge curve for a normalized one-month discharge life, obtained by discharging the cell at a constant load of 2.2 kilohms. As may be noted from the three curves, substantially all of the theoretically available material was consumed at a substantially uniform voltage which was essentially independent of the rate of discharge. The uniform voltage during discharge and the substantial utilization at high temperature of all active material theoretically available result in cells of extremely high efficiency.

Various methods may be used for assembling the solid state electric cells of this invention. Where conventional three-layer pellet-type solid state cells are prepared, the cell consists of anode, electrolyte, and cathode pellets compression-molded from powders. The dry pellets are then pressed together into contact and sealed to form a cell. Batteries consist of sealed cells joined electrically in series to produce the required voltage, and packaged to meet particular requirements. Thus batteries can be formed into many different shapes governed only by the complexity of the pellet dies. Sheet, torodial, or hollow tube batteries are readily feasible.

With the present non-iodine-yielding cathode, it is now feasible to provide cells that not only have markedly reduced shelf degradation because of the elimination of iodine diffusion, but also that may be prepared in the form of both thick- and thin-film devices because of the absence of an iodine vapor pressure. Thus thick or thin films contoured to components such as integrated circuit chips are now possible.

The terms "thin film" and "thick film" with reference to electrochemical and electronic devices and circuit components are used in a relative sense, and have frequently been used in the prior art interchangeably and confusingly. While relative differences in thickness exist, there is of course considerable overlapping. As used herein, by the term "thin-film devices" reference is generally made to devices formed with one or more deposited films having an overall thickness of less than about 10 microns, such films ordinarily being formed by vacuum-deposition techniques. Such vacuum-deposited thin films are usually several thousand angtrom units in thickness, that is, frequently less than 1 micron in thickness. By the term "thick-film devices," particularly as used in the art dealing with ceramic printed-circuit processes, reference is generally made to solid state devices formed with one or more deposited films having an overall thickness between about 5 and 1000 microns, these thick films usually being deposited by silk-screen or similar screening processes. Such printed-circuit films are generally between about 10 and 15 microns in thickness.

By use of the nonvolatile cathode of the present invention, both thin-film and thick-film devices may now be formed upon any suitable substrate, either conductive or non-conductive. While techniques for deposition of a suitable thin-film layer by use of vacuum evaporation or electrolytic transport techniques may be utilized, it has been found that deposition of thin films and thick films, particularly the latter, by conventional silk-screen techniques are particularly suitable for forming stable devices.

It has further been found feasible to make stable, high current density, thick-film solid state electrochemical devices, utilizing the cathode of this invention, wherein all of the elements of the device are deposited as films upon a desired substrate by slurry or solution spraying from selected inert organic solvents. Thus the cathode of this invention now permits the formation of a rechargeable solid state cell or battery that is simply sprayed into place in thicknesses down to about 25 microns, generally between about 25 and 1000 microns. Of course thick-film solid state electrochemical devices may also be readily made in thicknesses greater than 1000 microns without resorting to pellet-type assembly. Once in place, the cell or battery has an almost unlimited shelf-life. Such a device, for example, is formed by successively spraying from a slurry or solution in an inert organic solvent, e.g., acetone, a silver-carbon-electrolyte anode; a solid ionically conductive electrolyte, e.g., rubidium silver iodide ($RbAg_4I_5$); and a cathode material containing a tellurium tetraiodide component. Such sprayed thick-film devices and the methods of forming them are described more fully in copending application S.N. 56,956 of Guy Ervin, III, "Solid State Cell and Process Therefor," filed of even date herewith and assigned to the assignee of this application.

The following examples are illustrative of the practice of this invention with respect to preferred embodiments relating to solid state cells utilizing improved cathode compositions. These examples should not be construed as limiting with respect to optimization of cell current and voltage, which are also functions of the material selected for the electrodes and electrolyte, cell construction techniques, and internal resistance of the cell as determined by electrolyte layer thickness, contact resistance between adjacent layers, and other related cell parameters. For a solid state cell having a conductive silver anode and a silver-ion electrolyte, the cell voltage will generally be a function of the cathode composition, although the current obtained will also be dependent upon the other parameters as described. Optimization of these several parameters may be achieved by routine experimentation in accordance with the teachings of this invention and the known art relating to solid state cells.

EXAMPLE 1

Preparation of tellurium tetraiodide and its complexes (a) Tellurium tetraiodide was prepared by direct reaction between 8.30 grams finely divided tellurium metal and 33.0 grams iodine at a temperature of 140° C. Tellurium tetraiodide was obtained as finely divided black crystals.

(b) $Rb_2TeI_6$ was prepared by reacting tellurium dioxide with rubidium iodide in a 1:2 molar ratio in a hydriodic acid solution according to the following exemplary reaction:

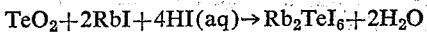

EXAMPLE 2

Preparation of cathode blends

The cathode blends are prepared by intermixing the pre-formed tellurium tetraiodide electron-acceptor material with a conductive carbon and optionally with ionically conductive electrolyte material. Alternatively, the cathode blends are prepared by reacting all ingredients together so as to form the electron-acceptor material in situ, intermixed with the conductive carbon present. Solid electrolyte material is then optionally blended with the carbon-acceptor blend.

(1) A cathode blend containing a tellurium tetraiodide complex represented by the formula

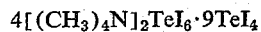

as electron-acceptor material was prepared by blending 16.59 grams tellurium metal and 13.48 grams finely divided conductive carbon black together with 16.08 grams $(CH_3)_4NI$ in a Waring Blendor. The resulting material was vacuum dried overnight at 70° C., 66.0 grams of iodine was added, and the entire composition was stirred. The blend was annealed in a closed, glass curing vessel for 16–20 hours at 145±5° C. The mix was maintained at 100±10° C. and vacuum evacuated to remove any excess iodine, using a liquid nitrogen cold trap. Then 37.3 grams $RbAg_4I_5$ was added, and the mix was blended in a Waring Blendor to appropriate mesh size (−300 mesh). Following vacuum drying at 70° C., the mixture was stored in a closed bottle over $Mg(ClO_4)_2$.

Various other cathode batches were prepared using essentially the foregoing blending, annealing, and vacuum-drying procedures:

(2) Preparation of $[(CH_3)_4N]_2TeI_6$-containing cathode batch. The initial blend contained 8.30 grams Te metal, 6.74 grams carbon black, 8.04 grams $(CH_3)_4NI$ and 30.0 grams iodine. After processing as in (1) above, 18.65 grams of $RbAg_4I_5$ electrolyte was blended with the carbon-acceptor blend.

(3) Preparation of $Rb_2TeI_6$-containing cathode batch. The initial blend contained 8.30 grams Te metal, 6.7 grams carbon black, 13.81 grams RbI and 33.0 grams iodine. Processing was as in (1) above.

EXAMPLE 3

Preparation of pellet-type solid state cell

A pellet-type cell configuration is particularly suited to applications requiring low voltage, that is, less than 10 volts, and medium capacity, e.g., 10 to 200 milliampere-hours dependent on volume availability, but not restricted to this range. The anode pellet consisted of a mixture of silver, carbon and $RbAg_4I_5$; the electrolyte pellet contained $RbAg_4I_5$; and the cathode batch perpared in Example 2 (2) above was utilized for the cathode pellet. Typical cell dimensions exclusive of packaging materials were 22 millimeters in diameter and 2.5 millimeters in thickness. The theoretical cell capacity was 200 milliampere-hours. The open circuit voltage of the cell at 175° C. was 630 millivolts. Typical discharge life curves, on a normalized basis, obtained with such cells are shown in FIG. 2.

EXAMPLE 4

Preparation of thick-film cell by spray deposition technique

A thick-film galvanic cell was constructed by a spray deposition technique wherein slurries in an organic carrier material of each electrode and of the electrolyte were separately sprayed using an air brush onto a substrate surface. The organic carrier material, e.g., acetone, is removed between applications by treatment under vacuum at a temperature below the $RbAg_4I_5$ electrolyte melting point (232° C.). A typical experimental cell constructed in this maner contained as the anode a mixture of silver, $RbAg_4I_5$, and carbon black; as the electrolyte $RbAg_4I_5$; and as the cathode a mixture of $Rb_2TeI_6$ as the oxidant or electron-acceptor material together with carbon black and $RbAg_4I_5$. The cell had a thickness of about 635 microns, including metal back-up plates, and the electrode cross-sectional area was 3.6 cm.² This cell had an open-circuit voltage of 0.53 volt at room temperature. When discharged at 0.6 milliampere it yielded about 15 minutes of operation to 80% of the open circuit voltage. The cell was then recharged and an identical discharge curve was obtained on the second cycle. Flash currents as high as 300 milliamperes have been obtained on cells of this type.

EXAMPLE 5

Preparation of thick-film silk-screened cell

A thick-film solid state galvanic cell was constructed utilizing the technique of silk screening. Successive layers of the appropriate electrochemical materials were screened onto an inert substrate of alumina using a standard ink carrier which contained butyl cellosolve as the carrier for the anode, electrolyte, and cathode powders. Between applications of the electrode and electrolyte materials, the device was baked to remove volatiles. The silver electrode (anode) consisting of an intimate blend of silver metal, carbon, and $RbAg_4I_5$ was first screened onto the alumina substrate. After baking, $RbAg_4I_5$ was screened onto the silver electrode layer. The screened cathode utilized for the electron-acceptor layer consisted of an intimate blend of $Rb_2TeI_6$, carbon, and $RbAg_4I_5$. A typical cell was 15.9 millimeters wide, 31.7 millimeters in length, and about 250 microns in thickness. It had an open circuit voltage of 0.54 volt. When discharged at room temperature across a 59-kilohm load, the unit delivered about 0.5 milliampere-hour, or in excess of 40 hours of operation to a cut-off voltage equal to 80% of the open-circuit voltage. The constant load corresponded to a constant current of approximately 10 microamperes.

It will of course be understood that many variations may be made with respect to the design and operation of the solid state electrochemical devices provided by this invention without departing from the broad inventive concept herein, namely, the use of tellurium tetraiodide, alone or in admixed or complexed form, as the active electron-acceptor component of the cathode of a solid state galvanic cell. With respect to details of construction relating to the prefererred embodiments of solid state electric cell, substantially all of the improved features of construction used for conventional solid state electric cells in order to minimize polarization and provide stability of the cathode and anode may be readily utilized with substantially little or no modification with respect to the cell construction taught herein. However, the present cells are particularly advantageous with respect to the formation of thick-film cells and batteries by use of spray-deposition or silk-screen techniques. Heretofore it has not been found practically feasible to construct solid state cells having thin layers because of the need to contain the iodine diffusing from the cathode material utilized.

Furthermore, the present cells are particularly advantageous for operation at high temperatures compared with cells using polyiodide cathodes in that high temperature operation with such latter cells is limited by the lower melting point of the polyiodide cathodes. For example, continuous operation at temperatures above 100° C. is not ordinarily feasible with many of these polyiodide materials. However, cells containing the non-iodine-yielding cathodes of this invention are operable to the melting point of $RbAg_4I_5$ (232° C.). Thus such cells are of particular utility for applications in fields such as oil-well testing, where temperatures in the range of 150–200° C. may be encountered for several weeks. Conventional batteries of the liquid electrolyte type or solid state cells using polyiodide cathodes are unsuitable for continuous operation at temperatures in this range.

Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

We claim:
1. A solid state electric cell having an anode, a cathode and a solid electrolyte disposed therebetween in cooperative relation, wherein the improvement comprises a cathode wherein the active electron-acceptor material component consists essentially of tellurium tetraiodide or complexes thereof.
2. A cell according to claim 1 wherein tellurium tetraiodide is complexed with MI or QI, M representing an alkali metal cation selected from K, Rb, $NH_4$, Cs and combinations thereof, Cs being present only as a minor constituent of M; and Q representing a univalent organic ammonium cation having an ionic volume between 30 and 85 cubic angstroms.
3. A cell according to claim 1 wherein the electron-acceptor material is selected from $TeI_4 \cdot aMI$ and $TeI_4 \cdot bQI$ where a and b have any values between 0 and 2, M and Q being as defined in claim 2.
4. A cell according to claim 1 wherein the electron-acceptor material is represented by the formula

$Rb_2TeI_6 \cdot TeI_4$

5. A cell according to claim 1 wherein the electron-acceptor material is represented by the formula $Rb_2TeI_6$.
6. A cell according to claim 1 wherein the electron-acceptor material is represented by the formula

$4[(CH_3)_4N]_2TeI_6 \cdot 9TeI_4$

7. A cell according to claim 1 wherein the electron-acceptor material is represented by the formula

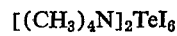

$[(CH_3)_4N]_2TeI_6$

8. A cell according to claim 1 wherein said anode comprises silver, said solid electrolyte is a silver-ion electrolyte selected from the class consisting of $MAg_4I_5$ and $QAg_nI_{n+1}$, n having a value between 3 and 39 and M and Q being as defined in claim 2.
9. A cell according to claim 8 wherein said anode comprises an intimate mixture of silver, carbon, and solid electrolyte material, and said cathode comprises an intimate mixture of at least carbon and an electron-acceptor material selected from tellurium tetraiodide and complexes thereof.
10. A cell according to claim 9 wherein the tellurium tetraiodide is complexed with MI or QI.
11. A cell according to claim 9 wherein the electron-acceptor material is selected from $TeI_4 \cdot aMI$ and $TeI_4 \cdot bQI$ where a and b have any values between 0 and 2, M and Q being as defined in claim 2.
12. A cell according to claim 8 wherein the solid electrolyte is $MAg_4I_5$ and the electron-acceptor material is selected from $TeI_4 \cdot aMI$ and $TeI_4 \cdot bQI$, where a and b have any values between 0 and 2.
13. A cell according to claim 12 wherein the electron-acceptor material is selected from $Rb_2TeI_6 \cdot TeI_4$, $Rb_2TeI_6$, $4[(CH_3)_4N]_2TeI_6 \cdot 9TeI_4$, and $[(CH_3)_4N]_2TeI_6$.

14. A cell according to claim 8 wherein the solid electrolyte has the formula $QAg_nI_{n+1}$ and the electron-acceptor material is selected from $TeI_4 \cdot aMI$ and $TeI_4 \cdot bQI$, where $a$ and $b$ have any values between 0 and 2.

15. A cell according to claim 14 wherein the solid electrolyte has the formula $(CH_3)_4NAg_nI_{n+1}$, $n$ having a value between 4 and 9, and wherein the electron-acceptor material is selected from $4[(CH_3)_4N]_2TeI_6 \cdot 9TeI_4$, $$[(CH_3)_4N]_2TeI_6$$

$Rb_2TeI_6 \cdot TeI_4$, and $Rb_2TeI_6$.

References Cited

UNITED STATES PATENTS

| | | | |
|---|---|---|---|
| 3,443,997 | 5/1969 | Argue et al. | 136—83 R |
| 3,476,605 | 11/1969 | Owens | 136—83 R |

WINSTON A. DOUGLAS, Primary Examiner

C. F. LEFEVOUR, Assistant Examiner

U.S. Cl. X.R.

136—153